July 16, 1968  O. M. HART  3,393,393
LINE TAP APPARATUS
Filed Sept. 13, 1966  3 Sheets-Sheet 1
Fig. 1.
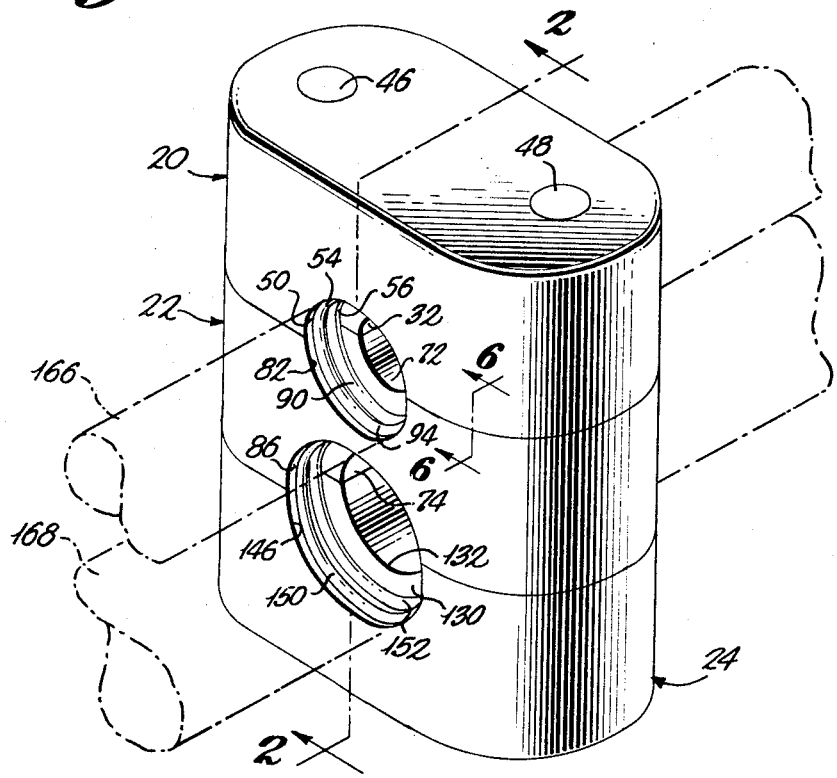
Fig. 2.
Fig. 3.
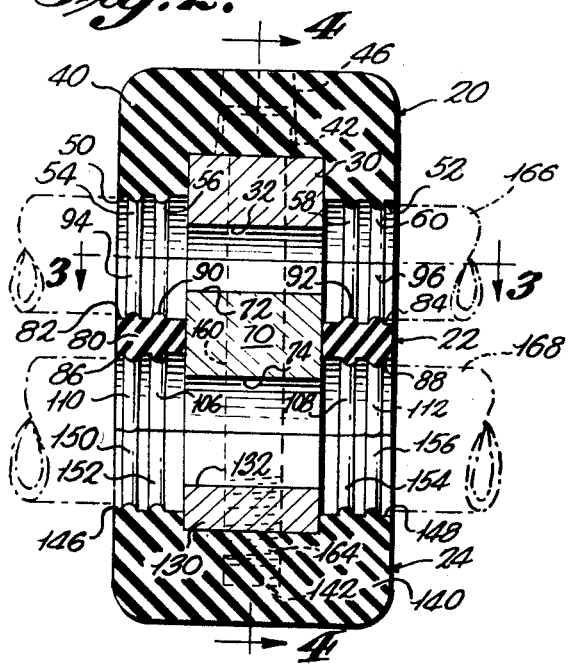
INVENTOR
Oliver M. Hart
BY Shoemaker and Mattare
ATTORNEYS July 16, 1968
O. M. HART
3,393,393
LINE TAP APPARATUS
Filed Sept. 13, 1966
3 Sheets-Sheet 2
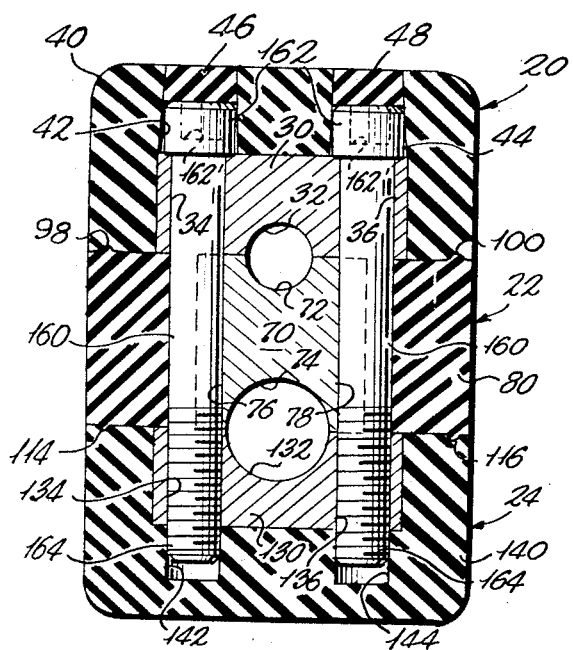
Fig. 4.
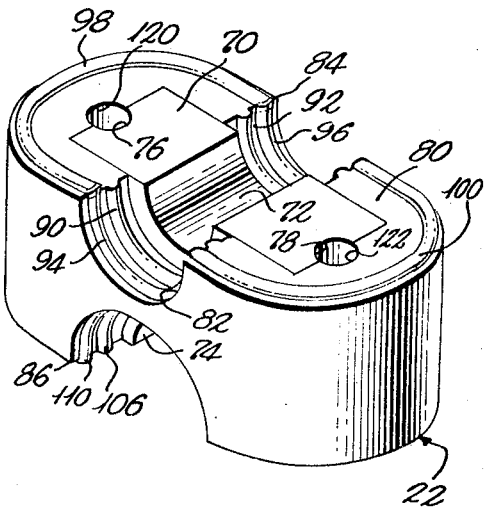
Fig. 5.
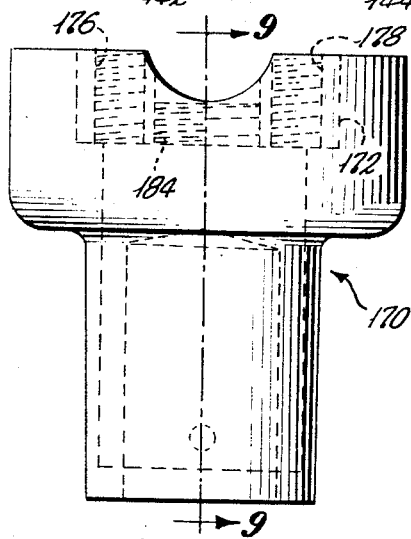
Fig. 6.
Fig. 7.
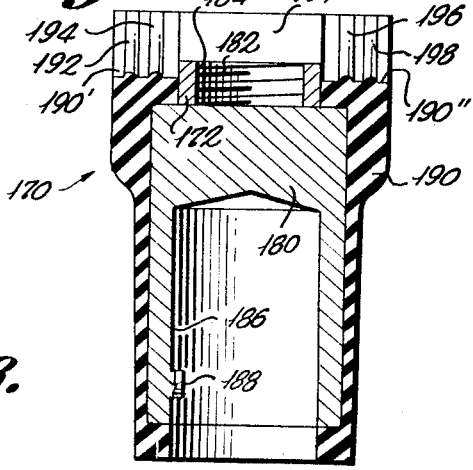
Fig. 9.
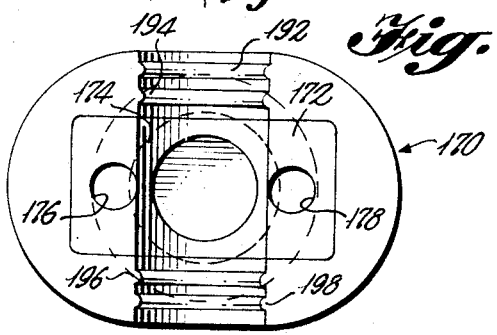
Fig. 8.
INVENTOR
Oliver M. Hart
BY Shoemaker and Mattare
ATTORNEYS July 16, 1968     O. M. HART     3,393,393
LINE TAP APPARATUS
Filed Sept. 13, 1966     3 Sheets-Sheet 3
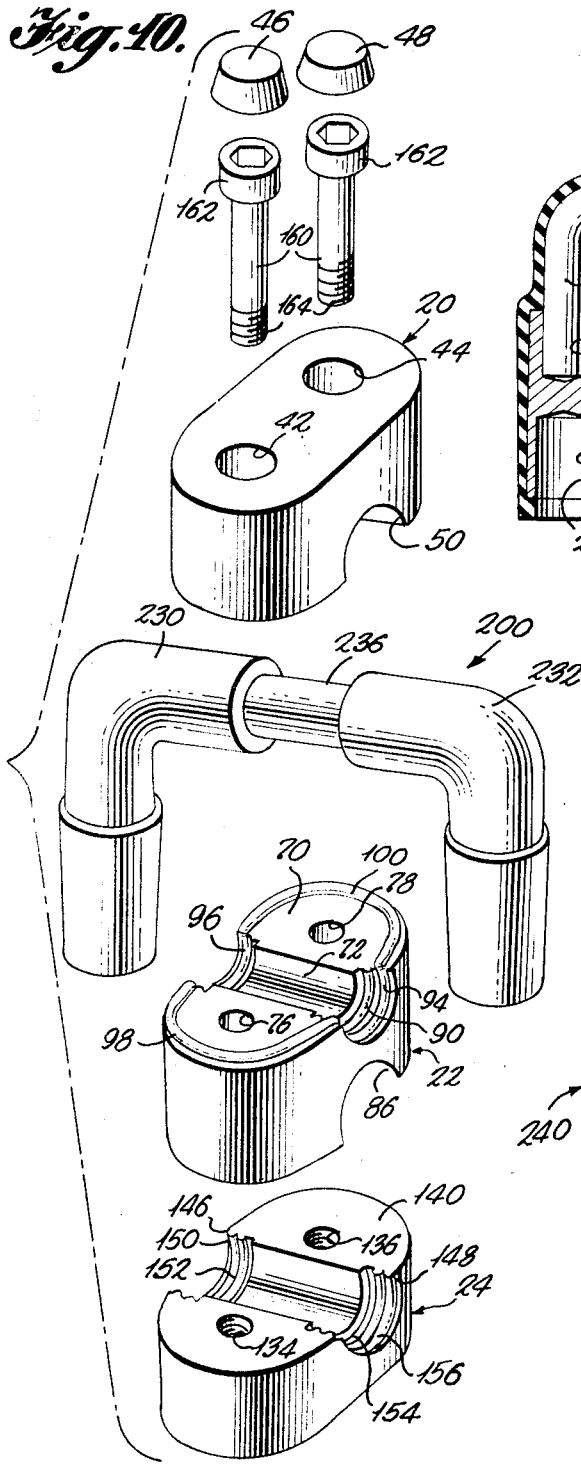
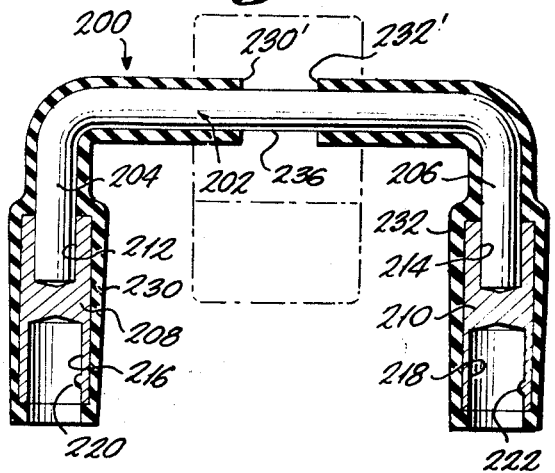
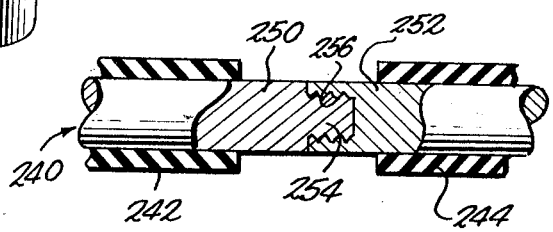
INVENTOR
Oliver M. Hart United States Patent Office 3,393,393
Patented July 16, 1968

3,393,393
LINE TAP APPARATUS
Oliver M. Hart, Cornwall Bridge, Conn. 06753
Filed Sept. 13, 1966, Ser. No. 579,046
8 Claims. (Cl. 339—60)

ABSTRACT OF THE DISCLOSURE

A first clamp means includes an electrically conductive portion embedded in an electrical insulating portion, and a second clamp means includes an electrically conductive portion embedded in an electrical insulating portion. A bared portion of an electrical cable is clamped between the conductive portions. Sealing means including a sealing rib formed continuously about the face of said second clamp means provides a fluid-tight seal with the first clamp means and with the insulation of the electrical cable associated therewith. Additional means is provided for connecting a second electrical cable to the second clamp means to provide an electrical connection between the first and second mentioned cables.

---

The present invention relates to new and novel line tap apparatus, and more particularly to apparatus for tapping off of insulated electrical cables.

The present invention is especially adapted for use with large electrical cables as used in power distribution systems, and a typical application of the invention would be for use with welding cables or for tapping off of a riser in a power house and the like.

This type of apparatus must be such that it can be readily attached to a large electrical cable, and typically the insulation is stripped from the cable at a small portion thereof for connection of the line tap apparatus. In the present invention, the line tap apparatus may be readily clamped on an electrical cable, and is practically unbreakable when mounted in operative position due to the fact that the electrically conductive portions of the apparatus are embedded and molded within surrounding portions of electrical insulating material such as relatively hard rubber. This insulating material is adapted to withstand heavy use and abuse, and will protect the metallic electrically conductive components therewithin.

The line tap apparatus of the present invention includes a plurality of components which may be readily assembled, and when in assembled relationship sealing means is provided on the components to assure that a substantially water-proof connection is provided between the components of the line tap apparatus and the insulation of the associated electrical cable. This is important to assure that there is not a possibility of accidental shock to personnel handling the cable and further to prevent sparks and fires or the like. In the prior art, line tap connections have been waterproofed by adding tape about the assembly. There is no necessity for providing additional tape or the like in the present arrangement wherein the components of the apparatus themselves ensure an effective fluid-tight seal when the components are in clamped operative position.

The sealing means in the present invention takes the form of ribs having a generally semicircular cross-sectional configuration so that the sealing means acts like an O-ring. With this arrangement, the sealing means is adapted to effectively provide a seal with cables having insulating portions of different outer diameter. This outer diameter will vary from one manufacturer to another, and it is important to provide a sealing means which will accommodate such manufacturing tolerances.

A further important feature of the present invention is the fact that the apparatus includes interchangeable components having electrically conductive portions of different constructions so that the apparatus may be employed with different size cables. Furthermore, these interchangeable components are of such a nature that they can be stacked one upon the other to interconnect any number of cables as desired.

Securing means is provided for clamping the components of the line tap apparatus of the present invention to one another with considerable pressure. This clamping pressure ensures good electrical contact between the conductor of an associated electrical cable and the line tap apparatus. An attachment is also provided according to the present invention whereby a cable may be connected with another cable at various angles relative thereto. This attachment may also be formed as a plurality of parts so that it can be operatively associated with the line tap apparatus for connecting either a single cable thereto or a pair of cables as the case may be.

An object of the present invention is to provide new and novel line tap apparatus for readily tapping off of power distribution insulated electrical cables and the like, and wherein the apparatus is practically unbreakable.

Another object is the provision of line tap apparatus which is readily assembled, and when in assembled relationship provides a substantially water-proof seal between the apparatus and the associated electrical cable insulation without the necessity of employing sealing tape or other additional means.

Still another object of the invention is to provide line tap apparatus including sealing means which effectively seals the apparatus with cables having insulation of differing outer diameter.

Yet another object of the invention is the provision of line tap apparatus which can be used with various combinations of different size cables and which can be connected with more than two cables if so desired.

A still further object of the invention is to provide line tap apparatus which ensures good electrical contact with the condutcor of an associated cable.

A further object of the invention is the provision of an attachment for use with line tap apparatus which enables cables to be connected at different angles with respect to one another as desired.

Other objects and many attendant advantages of the invention will become more apparent when considered in connection with the specification and accompanying drawings, wherein:

FIG. 1 is a top perspective view of the assembled line tap apparatus of the present invention:

FIG. 2 is a sectional view taken substantially along line 2—2 of FIG. 1 looking in the direction of the arrows;

FIG. 3 is a sectional view taken substantially along line 3—3 of FIG. 2 looking in the direction of the arrows;

FIG. 4 is a sectional view taken substantially along line 4—4 of FIG. 2 looking in the direction of the arrows;

FIG. 5 is a top perspective view of an intermediate clamp means in the apparatus of the present invention;

FIG. 6 is an enlarged sectional view taken substantially along line 6—6 of FIG. 1 looking in the direction of the arrows;

FIG. 7 is a front view of a modified form of clamp means;

FIG. 8 is a top view of the structure shown in FIG. 7;

FIG. 9 is a sectional view taken substantially along line 9—9 of FIG. 7 looking in the direction of the arrows;

FIG. 10 is a top perspective exploded view illustrating the line tap apparatus of the present invention in association with an attachment;

FIG. 11 is a longitudinal section through the attachment shown in FIG. 10; and

FIG. 12 is an enlarged sectional view through a portion of the attachment illustrating a modification thereof.

Referring now to the drawings wherein like reference characters designate corresponding parts throughout the several views, a first form of the invention is illustrated in FIGS. 1–5 inclusive. The line tap apparatus as shown in these figures includes a first clamp means 20, a second clamp means 22, and a third clamp means 24. Clamp means 20 comprises an electrically conductive portion 30 having a clamping part 32 of generally semicylindrical configuration for receiving and clamping a cable conductor therewithin. A pair of holes 34 and 36 are provided through electrically conductive portion 30 for receiving the cap screws hereinafter described for clamping the components of the apparatus in assembled operative relationship.

The electrically conductive portion 30 may be formed of a suitable good electrical conductor such as copper and the like, portion 30 being embedded within a body 40 of electrical insulating material which is molded about portion 30. Insulating portion 40 may be formed of neoprene or other suitable electrical insulating material. Portion 40 is provided with a pair of recesses 42 and 44 for receiving the enlarged heads of the cap screws hereinafter described, recesses 42 and 44 tapering to a smaller dimension in an upward direction as seen in FIG. 4. Small correspondingly tapered plugs 46 and 48 are adapted to be pressed into the upper ends of recesses 42 and 44 for sealing off these recesses when the apparatus is in assembled relationship.

As seen most clearly in FIG. 2, insulating portion 40 is provided with generally semicylindrical cutouts 50 and 52 at opposite sides thereof adjacent to the opposite ends of the clamping portion 32, cutouts 50 and 52 being of greater size than clamping portion 32. Cutout 50 is provided on the inner surface thereof with a pair of spaced sealing ribs 54 and 56 each of which is substantially semicircular in cross-sectional configuration and which extends from one bottom surface of clamp means 20 to the other bottom surface thereof to define a continuous arcuate rib within cutout 50. In a similar manner, sealing ribs 58 and 60 are provided on the inner surface of cutout 52.

The second clamp means 22 includes an electrically conductive portion 70 having clamping parts 72 and 74 thereon. These clamping parts face in opposite directions and are formed on the upper and lower portions of the electrically conductive portion 70 as shown in the drawings. As seen most clearly in FIG. 4, it will be noted that the clamping parts 72 and 74 are of different size, or in other words are formed on different radii so that they are adapted to clamp the conductors of different size cables. Electrically conductive portion 70 is also provided with generally semicylindrical cutouts 76 and 78 in the opposite lateral portions thereof for receiving the cap screws hereinafter described.

The electrically conductive portion 70 is embedded within a body 80 of electrical insulating material similar to the material 40 previously discussed. The insulating material 80 is molded about the electrically conductive portion 70 and includes a first pair of cutouts 82 and 84 at opposite sides thereof and disposed outwardly of opposite ends of the clamping part 72 of the conductive portion 70. A similar pair of cutouts 86 and 88 are provided just beneath cutouts 82 and 84 respectively and on opposite sides of the clamp means at points disposed adjacent the opposite ends of the clamping part 74.

Sealing means in the form of ribs is also provided on the second clamp means, and a first pair of sealing ribs 90 and 92 are provided along the inner surfaces of cutouts 82 and 84 respectively, each of these ribs being substantially semicircular in cross-sectional configuration and adapted to engage the outer insulation on an electrical cable.

Further sealing ribs 94 and 96 are provided laterally outwardly of ribs 90 and 92 respectively. Each of ribs 94 and 96 is also of generally semicircular cross-sectional configuration, one end of each of these ribs being integral with opposite ends of a rib portion 98, and the opposite ends of each of these ribs being integral with a rib portion 100. It is noted that rib portions 98 and 100 are disposed on the upper surface of the second clamp means as seen in FIG. 5, the ribs 94, 96 and portions 98 and 100 being continuous about the upper surface of the electrical insulating material 80 so as to provide a continuous sealing rib means.

Sealing ribs 106 and 108 are provided on the inner surface of cutouts 86 and 88, these latter sealing ribs being of substantially semicircular cross-sectional configuration and corresponding with the ribs 90 and 92 previously described. Sealing ribs 110 and 112 are identical with sealing ribs 94 and 96, these ribs 110 and 112 being formed integral with rib portions 114 and 116 as seen in FIG. 4 which correspond with the rib portions 98 and 100 respectively, whereby the under surface of the second clamp means is provided with sealing rib means in the same manner as the upper surface thereof for providing an effective fluid-tight seal with an adjacent clamp means as well as the associated electrical cable.

The insulating material 80 is also provided with generally semicylindrical recesses 120 and 122 which cooperate with the recesses 76 and 78 of the electrically conductive portion 70 to provide holes through which the cap screws hereinafter described extend.

The third clamp means 24 includes an electrically conductive portion 130 having a generally semicylindrical clamping part 132 which is adapted to cooperate with the clamping part 74 formed on the second clamp means for clamping the conductor of an electrical cable therebetween. A pair of threaded holes 134 and 136 are provided through member 130 for receiving the threaded ends of the cap screws hereinafter described. The third cap means includes a body of electrical insulating material 140 which is molded about the conductive portion 130 thereof. Body 140 includes a pair of recesses 142 and 144 aligned with the threaded holes 134 and 136 in the conductive portion 130, the recesses 142 and 144 being adapted to receive the lower ends of the cap screws hereinafter described.

As seen particularly in FIG. 2, a pair of cutouts 146 and 148 are provided in the insulating material 140 at opposite sides thereof and outwardly of the opposite ends of the clamping part 132 of the conductive portion 130. A first pair of sealing ribs 150 and 152 are formed along the inner surface of cutout 146, and a similar pair of sealing ribs 154 and 156 are formed along the inner surface of cutout 148. These various sealing ribs 150–156 corresponding to sealing ribs 54–60 of the first clamp means previously described.

A pair of identical cap screws 160 are provided each of these cap screws having enlarged heads 162 at the upper end thereof and including lower threaded ends 164. When it is desired to assemble the line tap apparatus illustrated in FIGS. 1–5, a pair of cables such as illustrated in phantom lines and identified by reference characters 166 and 168 may be provided, and a portion of the insulating material surrounding the conductors of the cables removed to provide a conductor portion substantially of a longitudinal dimension equivalent to that of one of the clamping parts of the clamp means so that the conductor portion of the cable will be clamped within the clamping parts of the electrically conductive portions of the various clamp means.

The conductor of the lower cable 168 may be tightly clamped between the clamping parts 74 and 132, while the conductor of cable 166 may be tightly clamped between the clamping parts 72 and 32. It is apparent that when the three clamp means 20, 22 and 24 are assembled into the operative relationship illustrated, the cap screws 160 may be inserted in the operative position illustrated and tightened by means of an Allen wrench or the like engaging a socket 162' provided in each of the enlarged heads 162 of the cap screws for this purpose. The cap screws may be tightened to a sufficient extent so as to draw the clamping parts of of the various clamp means into tight engagement with the conductor of the associated cables. At the same time, the sealing ribs 54–60 of the first clamp means, as well as the sealing ribs 90–96 of the second clamp means will be urged into firm fluid-tight contact with the outer surface of the insulation of the cable 166, and the sealing ribs 106–112 of the second clamp means and the sealing ribs 150–156 of the third clamp means will be urged into firm fluid-tight contact with the outer surface of the insulation of the second cable 168. At the same time, the rib portions 98 and 100 of the upper surface of the second clamp means 22 will be urged into firm fluid-tight contact with the under surface of the first clamp means 20, while the rib portions 114 and 115 on the under surface of the second clamp means 22 will be urged into firm fluid-tight contact with the upper surface of the third clamp means 24. As illustrated in FIG. 6, the substantially semicircular cross-sectional configuration of one of the rib portions such as rib portion 100 is shown as being deformed so as to compress and provide the desired fluid-tight seal so that a completely fluid-tight arrangement is provided between the various components of the line tap apparatus and the associated cables.

Referring now to FIGS. 7–9 inclusive, a modified form of clamp means according to the present invention is provided which is adapted to cooperate with a quick connect and disconnect coupling on an associated cable.

This modified clamp means is indicated generally by by reference numeral 170 and includes an electrically conductive portion 172 having a clamping part 174 of generally semicylindrical configuration adapted to clamp against the conductor of an electrical cable. This conductive portion includes a pair of threaded holes 176 and 178 for receiving the lower threaded ends of cap screws whereby clamp means 170 may be substituted for clamp means 24 in the previously described assembly.

A second electrically conductive portion 180 is provided with a threaded cylindrical portion 182 adapted to be threaded within a correspondingly threaded hole 184 provided in electrically conductive portion 172. The conductive portion 180 includes a generally cylindrical recess 186 having a projection 188 extending inwardly thereof. Recess 186 is adapted to receive a cooperating coupling member on the end of the cable and projection 188 is adapted to fit within a suitable slot provided in a quick connect and disconnect coupling on the end of the cable.

A body of insulating material 190 similar to the insulating material previously described is molded about conductive portions 172 and 180. This body of insulating material 190 is provided with cutouts 190' and 190'' at the opposite sides thereof adjacent the opposite ends of the clamping part 174. A first pair of sealing ribs 192 and 194 of generally semi-circular cross-sectional configuration are provided about the inner surface of cutout 190', and a similar pair of sealing ribs 196 and 198 are provided along the inner surface of cutout 190'', these sealing ribs serving the same purpose as the sealing ribs 150–156 of the previously described third clamping means.

It is apparent that the clamping means 170 as illustrated in FIGS. 7–9 may be substituted for the third clamping means 24 as illustrated in the previously described modification, or on the other hand, it can be substituted for the second clamp means 22 so that it cooperates with the clamp means 20 to clamp a first electrical cable conductor between the clamp portions 32 of clamp means 20 and 174 of clamp means 170, whereupon an additional cable may be connected with the assembly.

Referring now to FIGS. 10 and 11, a modified form of the invention is illustrated. In FIG. 10, the line tap assembly including clamp means 20, 22 and 24 is illustrated in exploded perspective view, and an attachment means is indicated generally by reference numeral 200. As seen most clearly in FIG. 11, the attachment means includes a central conductor 202 having parts 204 and 206 at the opposite ends thereof extending at an angle to the middle part of the central conductor. As illustrated, parts 204 and 206 may extend substantially perpendicular to the middle part of the central conductor.

Electrical connector means is provided at the outermost ends of the parts 204 and 206, these connector means comprising members 208 and 210 respectively having recesses 212 and 214 therewithin for receiving the parts 204 and 206.

Connector means 208 and 210 include recesses 216 and 218 having projections 220 and 222 extending therewithin respectively. These recesses 216 and 218 are adapted to receive suitable quick connect and disconnect fittings on the ends of associated cables.

Portions 230 and 232 are formed of an electrical insulating material such as neoprene rubber and the like and are molded about the portions as illustrated. Insulating portions 230 and 232 terminate at the portions 230' and 232' spaced from one another to provide a middle part of the central conductor 202 which is free of insulation and which is adapted to be clamped between the clamping parts of any of the various clamp means previously described.

As shown in FIG. 10, the middle part 236 will be clamped between the clamping part 32 of the first clamp means 20 and the clamping part 72 of the second clamp means 22 in the assembled relationship of the components. It is apparent that the attachment may be mounted in any suitable position so that the electrical connector means at the opposite ends thereof extend at any desired angle from the line tap apparatus assembly.

Referring now to FIG. 12, a modification of the attachment shown in FIG. 11 is illustrated. In this modification, the central conductor 240 corresponds to the central conductor 202, while the insulating portions 242 and 244 correspond to the insulating portions 230 and 232 previously described. The opposite ends of the attachment are of identical construction to that of the modification shown in FIG. 11, the only difference being that in the middle part of the central conductor, a modified construction is provided. In this form of the invention, the central conductor includes two separate portions 250 and 252, portion 250 including a threaded extension 254 which is adapted to be threaded within a threaded recess 256 provided in portion 252.

With the arrangement shown in FIG. 12, the two halves of the attachment may be detached from one another, and only one half thereof clamped in the assembly previously described, or alternatively, the two halves of the attachment may be threaded together and then clamped in the assembly previously described. Here again, the angular relationship of the attachment with respect to the line tap apparatus assembly may be varied as desired.

It is apparent from the foregoing that there is provided according to the present invention new and novel line tap apparatus adapted to readily tap off of power distribution insulating cables and which is practically unbreakable in construction. The apparatus may be readily assembled and when in assembled position provides a substantially water-proof seal with the associated cables without the necessity of providing additional tape or other means. The sealing ribs formed on the various clamp means of the present invention effectively seal with cables having insulation of different outer diameter thereby accommodating normal manufacturing tolerances. The interchangeable components of the apparatus of the present invention enables the apparatus to be used with various combinations of different size cables as well as permitting a number of clamp means to be stacked together so as to accommodate more than two cables if desired. The cap screws are adapted to provide considerable pressure between the clamp means of the present invention to ensure an effective electrical connection between the clamping parts and the cable conductors. The attachment of the present invention permits cables to be connected at different angles with respect to another cable as desired.

As this invention may be embodied in several forms without departing from the spirit of essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Line tap apparatus comprising first clamp means including an electrically conductive portion having a clamping part for receiving and clamping a cable conductor, said first clamp means including an electrical insulating portion, the electrically conductive portion of said first clamp means being embedded and molded within said electrical insulating portion, second clamps means including an electrically conductive portion having a clamping part for receiving and clamping a cable conductor, said second clamp means including an electrical insulating portion, the electrically conductive portion of said second clamp means being embedded and molded within the electrical insulating portion of said second clamp means, the electrically conductive portions of said first and second clamp means being adapted to receive and clamp a cable conductor therebetween to provide an effective electrical connection therewith, means for securing said first and second clamp means in operative relationship with respect to one another, sealing means on the electrical insulating portions of said first and second clamp means for providing an effective fluid-tight seal between the first and second clamp means and with the insulation of an electrical cable to provide a fluid-tight seal between the first and second clamp means and the associated electrical cable, said sealing means including a sealing rib formed continuously about a face of the insulating portion of said second clamp means, a face of the insulating portion of said first clamp means cooperating with and engaging said sealing rib to provide a fluid-tight seal, said sealing rib on the second clamp means providing a fluid-tight seal with the first clamp means and also with the insulation of an electrical cable associated therewith, and additional means for connecting a second electrical cable to said second clamp means so as to provide an electrical connection between such second cable and said first-mentioned cable operatively clamped between said first and second clamp means.

2. Apparatus as defined in claim 1, wherein said additional means includes an electrically conductive portion having a recess formed therein with a projection extending into said recess for cooperating with a quick-disconnect coupling member formed on the end of a second cable, said additional means including an electrical insulating portion, the electrically conductive portion of said additional means being embedded and molded within said last-mentioned electrical insulating portion.

3. Apparatus as defined in claim 1, including an attachment, said attachment having a central conductor including parts at opposite ends thereof extending at an angle to the middle part thereof, electrical connector means at the outer ends of the parts at opposite ends of said central conductor, electrical insulating means about said central conductor and about said connector means, the middle part of said central conductor being free of insulation and being clamped between the electrically conductive portions of said first and second clamp means.

4. Apparatus as defined in claim 1, wherein said additional means includes a third clamp means including an electrically conductive portion having a clamping part for receiving and clamping a cable conductor, said third clamp means including an electrical insulating portion, the electrically conductive portion of said third clamp means being embedded and molded within the electrical insulating portion of said third clamp means, the electrically conductive portion of said second clamp means including opposite clamping parts, one of which cooperates with the clamping part of the electrically conductive portion of said first clamp means and the other of which cooperates with the clamping part of the electrically conductive portion of said third clamp means, said securing means securing said three clamp means in operative relationship so as to clamp a pair of electrical cables therewithin and to provide an electrical connection between such cables.

5. Apparatus as defined in claim 4, wherein the opposite facing clamping parts of said second clamp means are arcuate in configuration and are of different size to receive different size cable conductors.

6. Apparatus as defined in claim 4, wherein said securing means comprises cap screw means, said first and second clamp means having holes formed therethrough for receiving said cap screw means, said third clamp means having threaded holes formed in the electrically conductive portions thereof for receiving the threaded end of said cap screw means.

7. Apparatus as defined in claim 4, including additional sealing ribs formed in the electrical insulating portion of each of said clamp means, said sealing ribs being formed adjacent opposite ends of the clamping part of the electrically conductive portion of the associated clamp means for providing a seal with the insulation of an electrical cable.

8. Apparatus as defined in claim 7, wherein each of said sealing ribs is of substantially semicircular cross-sectional configuration.

References Cited

UNITED STATES PATENTS

| 1,153,580 | 9/1915 | Sheppy | 339—207 X |
| 1,925,283 | 9/1933 | Searles | 339—210 X |
| 1,960,153 | 5/1934 | Hixon et al. | |
| 1,993,968 | 3/1935 | Lee. | |
| 1,999,045 | 4/1935 | Goetz. | |
| 2,033,199 | 3/1936 | Lee | 339—208 |
| 2,039,167 | 4/1936 | Hopkins | 339—268 X |
| 2,327,048 | 8/1943 | Joyce. | |
| 2,348,755 | 5/1944 | Reynolds et al. | |
| 2,851,670 | 9/1958 | Senior. | |
| 3,154,363 | 10/1964 | Will | 339—99 |

FOREIGN PATENTS 337,505  6/1921  Germany.

RICHARD E. MOORE, *Primary Examiner.*

MARVIN A. CHAMPION, *Examiner.*

PERRY TEITELBAUM, *Assistant Examiner.*